United States Patent [19]

Schlitt

[11] 4,455,277

[45] Jun. 19, 1984

[54] ELECTRON BEAM MAGNETIC SWITCH FOR A PLURALITY OF FREE ELECTRON LASERS

[75] Inventor: Leland G. Schlitt, Livermore, Calif.

[73] Assignee: The United States of America as represented by the United States Department of Energy, Washington, D.C.

[21] Appl. No.: 342,982

[22] Filed: Jan. 26, 1982

[51] Int. Cl.³ .............................. H01S 3/09; G21B 1/00
[52] U.S. Cl. .................................... 376/103; 376/129; 372/2
[58] Field of Search .................... 372/2, 69; 376/100, 376/103, 129

[56] References Cited

U.S. PATENT DOCUMENTS

| 3,398,376 | 8/1968 | Hirschfield | 372/2 |
| 3,879,679 | 4/1975 | Mourier | 372/2 |
| 4,189,686 | 2/1980 | Brau et al. | 372/2 |
| 4,283,687 | 8/1981 | Madey et al. | 372/2 |
| 4,287,488 | 9/1981 | Brau et al. | 372/2 |
| 4,323,857 | 4/1981 | Brau et al. | 372/2 |

OTHER PUBLICATIONS

H. Motz, Jour. of Appl. Phys., 22, 527 (5/51).
H. Motz et al., Jour. of Appl. Phys., 24, 826 (7/53).
H. Motz et al., Proc. of the Symp. on Millimeter Waves, Polytechnic Press, 1960, p. 155.
R. Pantell et al., IEEE Journ. of Quantum Electronics, QE-4, 905 (1968).
R. M. Phillips, I.R.E. Trans. on Electron Devices, 231 (Oct. 1960).
J. M. J. Madey, Jour. of Appl. Phys., 42 1906 (1971).
D. A. G. Deacon et al., Phys. Rev. Lett., vol. 38, No. 16, pp. 892–894, (Apr. 1977).

*Primary Examiner*—Sal Cangialosi
*Attorney, Agent, or Firm*—John F. Schipper; Clifton E. Clouse, Jr.; Michael F. Esposito

[57] ABSTRACT

Apparatus for forming and utilizing a sequence of electron beam segments, each of the same temporal length (substantially 15 nsec), with consecutive beams being separated by a constant time interval of the order of 3 nsec. The beam sequence is used for simultaneous inputs to a plurality of wiggler magnet systems that also accept the laser beams to be amplified by interaction with the co-propagating electron beams. The electron beams are arranged substantially in a circle to allow proper distribution of and simultaneous switching out of the beam segments to their respective wiggler magnets.

4 Claims, 4 Drawing Figures

ELECTRON BEAM MAGNETIC SWITCH FOR A PLURALITY OF FREE ELECTRON LASERS

The United States Government has rights in this invention, pursuant to Contract W-7405-ENG-48 between the U.S. Department of Energy and the University of California Lawrence Livermore National Laboratory.

FIELD OF THE INVENTION

This invention relates to means for producing and controlling a plurality of electron beam segments of arbitrary length and separation.

BACKGROUND OF THE INVENTION

The possibility of generating of partially coherent electromagnetic radiation, by collinear passage of the radiation and of a relativistic electron beam through a sequence of electric or magnetic fields of alternating polarity, has been recognized since the first publication by H. Motz, Journal of Applied Physics 22 527 (1950) on the subject. Motz considered a sequence of alternating direction magnetic fields, regularly spaced and transversely oriented relative to the common direction of travel of light beam and electron beam. Let $L_o$ be the fundamental period of variation of direction of the sequence of transverse magnetic fields and let the beam electrons move with velocity v≃c. The light beam photons will be absorbed and re-emitted by the electrons, and the frequency $\nu$ of emitted radiation will depend upon angle of observation $\theta$ relative to the common beam direction according to $\nu = v/L_o (1-\cos\theta)$. For a highly relativistic electron beam and modest transverse magnetic field strengths, most of the radiation appears in the forward direction, in a narrow cone of half angle of the the order of $\Delta\theta = m_e c^2/E_b$ where $$E_b = m_e c^2 / \sqrt{1 - \frac{v^2}{c^2}}$$

is the electron total energy.

Motz, Thon and Whitehurst, in Jour. of Appl. Phys. 24 826 (1953), further considered the co-propagating light beam and electron beam in a waveguide, obtained some interesting general classical relativistic relationships for electron orbits in a spatially varying B-field, and reported the experimental observation of visible and millimeter wavelength radiation for field strengths B≃3,900 and 5,600 Gauss.

In *Proceedings of the Symposium on Millimeter Waves* (Polytechnic Press, Brooklyn, 1960) p. 155, Motz and Nakamura analyzed the amplification of a millimeter wavelength electromagnetic wave interacting with a relativistic electron beam in the presence of a rectangular waveguide and a spatially oscillatory electric field, using a model of J. R. Pierce. The analysis was purely classical, and the gain was rather modest.

Pantell, Soncini and Puthoff discuss some initial considerations on stimulated photon-electron scattering in I.E.E.E. Journal of Quantum Electronics QE-4 905 (1968). Collinear scattering, with the incident photon energy $h\nu$ being $<<$ incident electron energy $E_{el}$ and periodic deflection of the electron beam by a microwave radiation field, is analyzed briefly; and a Compton scattering laser is proposed, using the input/output wavelength relation $$\nu_{out} = 4 \left( \frac{E_{el}}{m_e c^2} \right)^2 \nu_{in}.$$

Useful gain from the device appears to be limited to the middle-high infrared range $\lambda \geq 20 \mu m$.

Mourier, in U.S. Pat. No. 3,879,679, discloses a Compton effect laser that proceeds from the same principles as Pantell et al, supra. This invention, like that of Pantell et al, appears to require provision of an electron storage ring or the like for rapidly moving electrons and an optical cavity that is a part of the ring, for causing electron-photon scattering.

R. M. Phillips, in I.R.E. Transactions on Electron Devices, 231 (October 1960), used a periodic magnetic field, whose period may vary, to focus and axially bunch an electron beam traveling in an unloaded waveguide, together with a monochromatic light beam, to increase electron beam kinetic energy at the expense of light beam energy. The electron beam velocity was adjusted so that a beam electron travels one period L along its trajectory in the time required for the light beam (of wavelength $\lambda$) to travel a distance $L+\lambda$. The electron then senses only the retarding portion or only the accelerating portion of the electromagnetic wave. This approach converts transverse momentum, arising from the presence of the electromagnetic wave, into changes in axial momentum of the electron beam so that beam bunching occurs. Peak efficiency was about 10 percent for the experiments reported.

J. M. J. Madey, in Journal of Applied Physics 42 1906 (1971), discusses stimulated emission of bremsstrahlung by a relativistic electron into a single electromagnetic mode of a parallel light beam, where both electron and light beam move through a periodic, transverse d.c. magnetic field. Quantum mechanical and semi-classical calculations of transition rates and gain indicate that finite, practical gain is available in the infrared and visible portions of the optical spectrum. These considerations are incorporated in U.S. Pat. No. 3,822,410, issued to Madey for tunable apparatus for generation/amplification of coherent radiation in a single or a few closely spaced electromagnetic modes.

Hirschfield, in U.S. Pat. No. 3,398,376 for a relativistic electron cyclotron maser, discloses and claims use of an axial, monoenergetic relativistic electron beam ($E_{kinetic} \simeq 5$ keV) a spatially-varying longitudinal magnetic field coaxial with the beam, a weaker, transverse periodic electric or magnetic with a resulting helical pitch matching that of the electron motion at the predetermined beam velocity and a cavity resonator with a mode frequency matching that of the cyclotron frequency of the resulting spiraling electrons. The apparatus relies upon electron-cyclotron radiation and ignores any synchronization of electron beam and the electromagnetic beam to be amplified.

A combination free electron laser/gas laser with high pulse repetition rates is taught by U.S. Pat. No. 4,187,686, issued to Brau, Rockwood and Stern. In the embodiment disclosed, the free electron laser operates at infrared wavelengths and the gas laser operates at ultraviolet wavelengths. The monoenergetic electron beam is initially bunched and accelerated to ≃10 MeV kinetic energy and directed into and out of a multiplicity of serially arranged free electron lasers by turning magnets positioned at the ends of these lasers; finally, the electron beam is directed axially through a gas laser to utilize and convert additional electron beam energy to electromagnetic energy. The free electron laser appears to be of conventional form, utilizing fixed period magnetic fields to produce electron bremsstrahlung radiation and an optical resonator for light beam amplification.

SUMMARY OF THE INVENTION

An object of this invention is to provide apparatus for simultaneously switching a plurality of electron beam segments into a plurality of wiggler magnet regions for use in a free electron laser system.

Another object is to provide apparatus for accommodating a plurality of electron beam segments, to be used subsequently in a plurality of wiggler magnets in a free electron laser system, in a substantially smaller space than that required for storage and propagation of electron beam segments by conventional means.

Additional objects, novel features and advantages thereof are set forth in the detailed description, with reference to the accompanying drawings, and may be realized by means of the instrumentalities and combinations pointed out in the appended claims.

The subject invention is apparatus and method for simultaneously switching a plurality of electron beam segments into a plurality of wiggler magnet regions for use in a free electron laser system. To achieve the foregoing objects in accordance with the subject invention, as broadly described herein, the apparatus may comprise initial steering means to arrange the plurality of electron beam segments substantially in a circle of non-overlapping segments, with the front ends of adjacent beam segments being separated by a predetermined arc distance $\Delta s$ on the circle; a plurality of ring bending magnet/collimation magnet combinations, substantially equidistantally spaced apart a distance $\Delta s$ and positioned on or adjacent to the circle in which the electron beam segments move, with the number of bending magnet/collimation magnet combinations being at least as large as the number of electron beam segments; and a plurality of pulse beam deflector/wiggler pipe/wiggler magnet combinations, with one such deflector and one such pipe and one such wiggler magnet being associated with each ring bending magnet, to simultaneously switch electron beam segments out of the circular path and into a wiggler pipe for delivery to a corresponding wiggler magnet that forms part of the free electron laser system.

BRIEF DESCRIPTION OF THE DRAWINGS

The accompanying drawings illustrate one embodiment of the invention and, together with the detailed description, aid in explaining the principles of the invention.

DETAILED DESCRIPTION

The free electron laser (FEL) has been the subject of several papers and at least three U.S. patents, as discussed in the Background Section herein, as a possible coherent light amplifier. The FEL is an ideal laser that can be designed to operate at any frequency and is capable of high average power at high efficiency. D. G. Deacon and co-workers demonstrated a relativistic free electron laser in 1977 (Phys. Rev. Letters, 38 892–94). The subject invention provides apparatus and method for simultaneously switching a plurality of electron beam segments into their corresponding wiggler magnet regions for synchronized use in applications such as laser fusion drivers.

Figure 1:
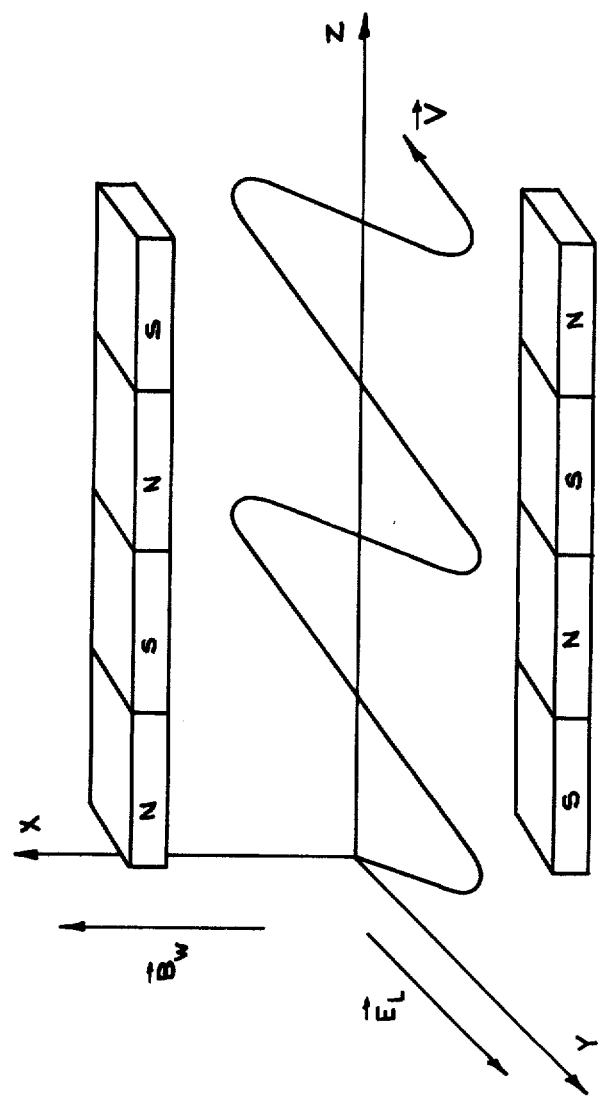
FIG. 1 is a schematic view of a wiggler magnet region, showing the orientation of the magnetic field ($B_W$), the polarization direction of the laser electromagnetic field ($E_L$) and the resulting peregrinations of a representative electron traversing the wiggler magnet region.

Referring to FIG. 1 of the drawings, the FEL uses a highly relativistic electron beam, a co-propogating light beam (to be amplified), and a transversely directed, spatially periodic magnetic field (the "wiggler" field) $B_w$ to convert electron longitudinal kinetic energy to electromagnetic energy at or around the frequency of the light beam by the interaction of the beam electrons with the electromagnetic fields set up by the light beam E-field and the transversely directed wiggler magnetic field. By judiciously varying the parameters of the FEL, the electrons can be forced to lose energy continuously, thereby permitting extraction of a sizable fraction of the electron beam's kinetic energy.

As illustrated in FIG. 1, the transversely directed wiggler magnetic field $B_w$ gives the electrons a component of velocity v parallel to the (polarized) laser electric field $E_L$ so that the laser radiation field and the electrons may exchange energy. If the period and strength of the magnetic field are properly matched to the representative velocity of the electrons, net energy can be continually transferred from the electron beam, thus providing laser amplification. This continuous transfer requires that the wiggler magnet be designed so that it will operate as a stable phase decelerator, which requires a continuous modification of the magnetic field period and/or strength as the electrons progressively lose energy. The subject invention provides apparatus and method for synchronously delivering a plurality of electron beams to separate wiggler magnet regions for use in an FEL system.

Figure 2:
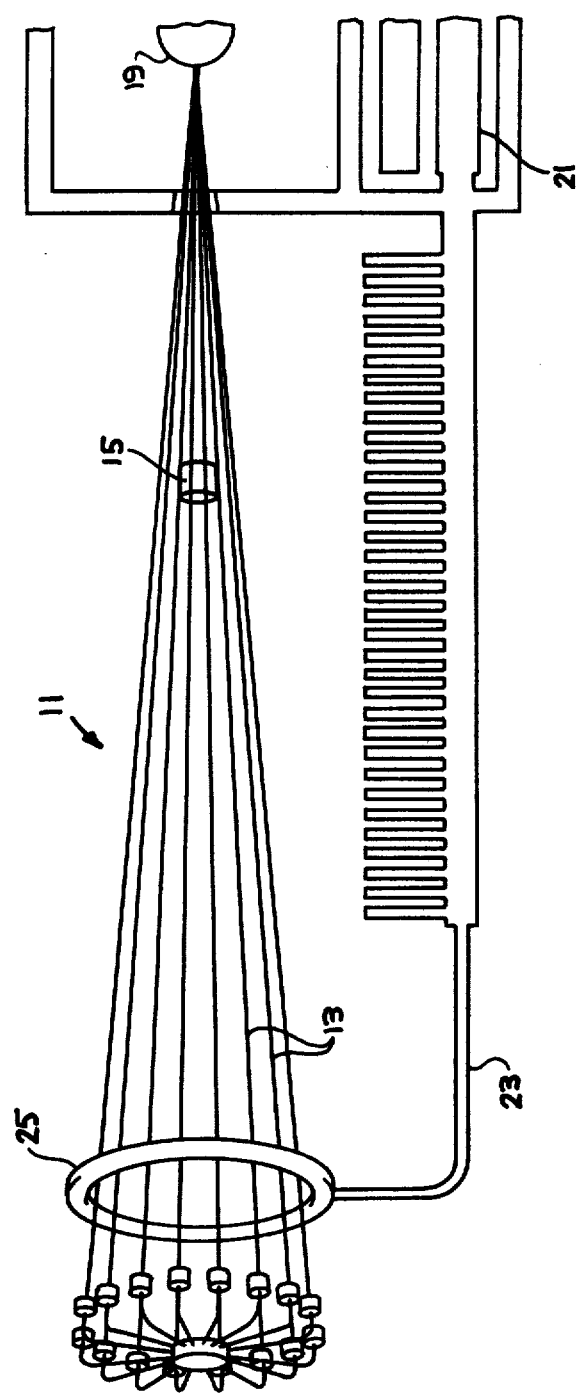
FIG. 2 is a schematic side view of the subject invention used in connection with a laser fusion target and chamber.

FIG. 2 is a schematic view of one half of a 3 MJ, 350 nm, FEL fusion driver as contemplated for use in laser fusion. The laser amplifier 11 may include a plurality (for example, 15) 120 m long wiggler magnets 13, each producing 100 kJ energy output. The FEL amplifiers are arranged in a cone around a "pellet factory" 15 and all are directed at the target position within the target chamber 19. The electron source for the FEL may consist of two 1.1 GeV betatrons 21 (only one shown) and two 50 MeV linear accelerators (LINACs: not shown) that serve as injectors for the betatrons. A long accelerator pulse ($\Delta t = 270$ nsec in one embodiment) is transported by an e-beam transport pipe 23 to an electron beam switch ring (the subject invention) 25, where fast magnetic switches having individual rise times as low as 3 nsec divide the pulse into, say, a sequence of 15-nsec flat top e-beam pulses separated by 3 nsec between consecutive pulses.

Figure 3:
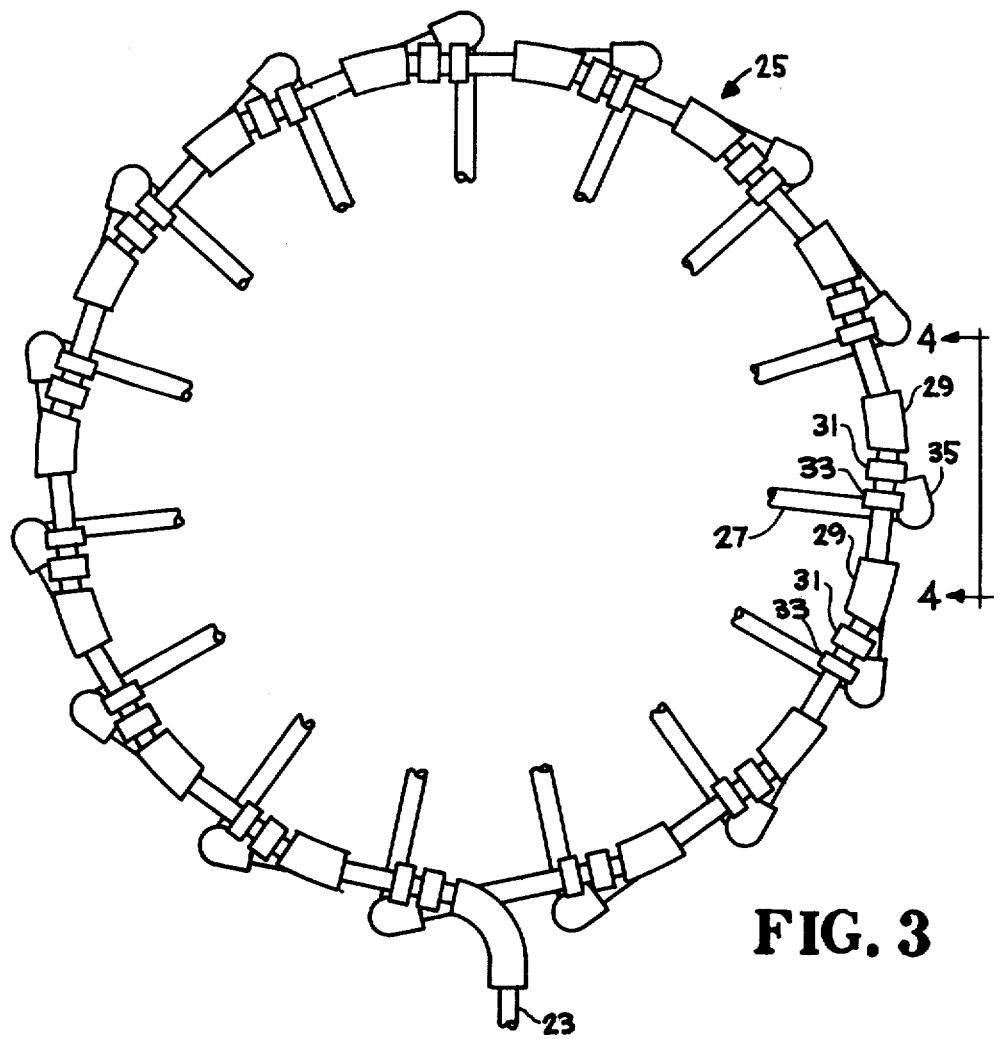
FIG. 3 is a plan view of an electron beam magnetic switch ring according to the invention.

In order to produce, say, 15 separated 15-nsec e-beam pulses from a single, long accelerator pulse, one must decompose the beam into individual segments and delay the segments relative to one another so that all can be injected by their respective wiggler magnet pipes 27 simultaneously. One method of providing the e-beam segment delay is to arrange the segments in an approximate "circle", as suggested in FIG. 3, such that the electron transit time from one wiggler input (a wiggler pipe) to the next is equal to the sum of the electron beam segment length (nominally 15 nsec) and the switch rise time (nominally 3 nsec). The electron beam can be steered around this "circle" by ring bending magnets 29 and collimation magnets 31 until the circle is filled, at which point all beam switches (one per wiggler pipe and per wiggler magnet) are activated simultaneously to divert individual beam segments into bending magnets that direct the beam's segments into their respective wiggler magnets. The beam switch includes a pulsed deflector 33 to deflect the e-beam segment from the plane of the "circle" in another direction toward a corresponding wiggler bending magnet 35 that redirects the segment along a wiggler pipe 27.

Figure 4:
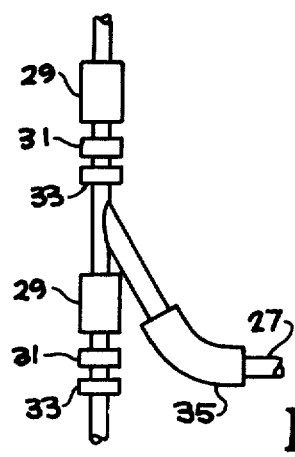
FIG. 4 is a side view of the ring bending magnet/collimation magnet and pulsed deflector/wiggler bending magnet/wiggler pipe combinations according to the invention.

FIG. 4 shows the ring bending magnet/collimation magnet combination and the pulse deflector/wiggler input bending magnet/wiggler pipe in greater detail. The ring bending magnet 29 and collimation magnet 31 operate in a steady state mode to continually redirect and recollimate the electron beam segments as the segments travel along the perimeter of the "circle". At a predetermined time, the pulsed electron beam segment deflector 33 is activated and the adjacent electron beam is deflected out of the circle to a wiggler input bending magnet 35 that further redirects the electron beam segment into a wiggler pipe 27 leading to a corresponding wiggler magnet region. The electron beam switches can be built with much faster rise times than a betatron extractor switch as the beam switches will have much smaller transverse dimensions and hence smaller volumes than the extractor. The electron beam switch may comprise a transmission line into which a monochromatic electromagnetic pulse is injected at one end while the electron beam propagates down the transmission line from the opposite end, with a combination of electric and magnetic fields of the switching pulse serving to deflect the electron beam. A switch rise time of 3 nsec appears possible for an electron beam having 0.5 cm diameter.

The foregoing description of a preferred embodiment of the invention is presented for purposes of illustration only and is not intended to limit the invention to the precise form disclosed; modification and variation may be made without departing from what is regarded as the scope of the invention.

I claim:

1. Apparatus for simultaneous switching, over a time interval $\Delta t$(switching time) of each of a plurality of electron beam segments of substantially identical temporal length $\Delta t$(pulse length) electron beam segments into separate wiggler magnet regions in a free electron laser system, the apparatus comprising:

initial steering means to arrange the plurality of electron beam segments in a common circle, with adjacent beam segments being separated by an arc distance $\Delta s = v\Delta t$, where v is the representative velocity with which the electron beam segments move in the common circle and $\Delta t = \Delta t$(pulse length) $+ \Delta t$(switching time);

a plurality of ring bending magnet/collimation magnet combinations, spaced apart substantially a distance $\Delta s$ and positioned on or adjacent to the common circle in which the plurality of electron beams moves, with the number of bending magnet/collimation magnet combinations being at least as large as the number of electron beam segments moving in the common circle; and a plurality of pulsed beam deflectors/wiggler pipes/wiggler magnet combinations, one such deflector and one such pipe and one such wiggler magnet being associated with each ring bending magnet, to simultaneously switch each electron beam segment out of the common circle and into a wiggler pipe for delivery to a corresponding wiggler magnet, for use in the free electron laser system.

2. Apparatus according to claim 1, wherein said $\Delta t$(pulse length) is at least 15 nanoseconds and said $\Delta t$(switching time) is at least 3 nanoseconds.

3. Apparatus according to claim 1, wherein the direction of each of said wiggler pipes is chosen substantially perpendicular to the plane defined by said circle in which said electron beam segments move, with each wiggler pipe being aligned with one of said wiggler magnet regions.

4. A method for simultaneous switching of each of a plurality of electron beam segments of substantially identical temporal length $\Delta t$ (pulse length) into separate wiggler magnet regions in a free electron laser system, the method comprising the steps of:

steering the plurality of electron beam segments in a common circle so that adjacent beam segments are separated by an arc length $\Delta s = v\Delta t$, where v is a representative velocity with which the electron beam segments move in the common circle and $\Delta t$ is a predetermined time interval determined by the sum of the temporal length of each beam segment and a second time interval $\Delta t_{sw}$;

providing a plurality of ring bending magnet/collimation magnet combinations on or adjacent to the common circle, with the combinations being substantially equidistantly spaced apart by a distance $\Delta s$ and with the number of beam switch/ring bending magnet/collimation magnet combinations being at least as large as the number of electron beam segments moving in the common circle;

providing a plurality of pulsed beam deflector/wiggler pipe combinations on or adjacent to the common circle, with these combinations being substantially equidistantly spaced apart by a distance $\Delta s$ and with the number of the deflector/wiggler pipe combinations being at least as large as the number of electron beam segments moving in the common circle; and substantially simultaneously activating the pulsed beam deflectors to switch each electron beam segment out of the circular path and into a wiggler pipe for delivery to a corresponding wiggler magnet.

* * * * *